US012677806B2

(12) United States Patent
Pan

(10) Patent No.: US 12,677,806 B2
(45) Date of Patent: Jul. 14, 2026

(54) INCUBATOR

(71) Applicant: Dezhou Economic Development Zone Xinghui Industry Design Studio, Dezhou (CN)

(72) Inventor: Wenqing Pan, Yuyao (CN)

(*) Notice: Subject to any disclaimer, the term of this patent is extended or adjusted under 35 U.S.C. 154(b) by 0 days.

(21) Appl. No.: 19/319,772

(22) Filed: Sep. 5, 2025

(65) Prior Publication Data

US 2026/0068858 A1     Mar. 12, 2026

(51) Int. Cl.
A01K 41/06          (2006.01)

(52) U.S. Cl.
CPC ..................................... A01K 41/06 (2013.01)

(58) Field of Classification Search
CPC .............................. A01K 41/06; A01K 41/065
See application file for complete search history.

(56) References Cited

U.S. PATENT DOCUMENTS

| | | | | |
|---|---|---|---|---|
| 1,478,201 | A | * | 12/1923 | Bishop ................... A01K 41/06 |
| | | | | 119/323 |
| 7,261,860 | B1 | * | 8/2007 | Vellinger .................. B04B 5/02 |
| | | | | 422/50 |
| 11,819,009 | B1 | | 11/2023 | Wang |
| 12,029,202 | B1 | | 7/2024 | Wang |
| 12,144,324 | B1 | | 11/2024 | Wang |
| 2019/0208749 | A1 | * | 7/2019 | Clark, Jr. ............... A01K 41/06 |
| 2019/0335718 | A1 | | 11/2019 | Zhao et al. |
| 2024/0196870 | A1 | * | 6/2024 | Wang .................... A01K 41/06 |

OTHER PUBLICATIONS

Translated (KR 20170102642 A) (Year: 2017), Bang So Yoon, Incubators for Poultry Provided With Warmth Means for Using No Power.*

* cited by examiner

*Primary Examiner* — Joshua D Huson
*Assistant Examiner* — Edgar Reyes
(74) *Attorney, Agent, or Firm* — Sam Pierce

(57)          ABSTRACT

An incubator, including: a base, at least one trough body and a driving mechanism. The at least one trough body is arranged on the base, both ends of the at least one trough body are provided with first connecting parts rotatably connected to the base, and an end of the at least one trough body further provided with a second connecting part. The driving mechanism comprises a driving part and a fixing part, the fixing part is located at one end of the at least one trough body, the second connecting part being rotatably connected with the fixing part; the driving part is drivingly connected with the fixing part to move the fixing part along a preset direction, thus driving the trough body to rotate. The incubator achieves automatic egg flipping and improves the stability and accuracy during the egg flipping process.

17 Claims, 8 Drawing Sheets

INCUBATOR

TECHNICAL FIELD

The present disclosure relates to the technical field of incubation technology, in particular to an incubator.

BACKGROUND

In traditional incubator designs, there are often issues such as complex egg-turning mechanisms and numerous parts, which lead to insufficient precision in egg-turning actions and poor stability. These issues can also cause errors to accumulate due to intermediate components, affecting the egg-turning effectiveness. Additionally, some incubators rely on manual egg turning, which is inefficient and difficult to ensure consistent egg-turning frequency. This can easily result in embryos sticking to the eggshell. Furthermore, traditional structural layouts tend to be loose, with low space utilization, increasing manufacturing and maintenance costs. The redundant structure may also affect the stability of the incubation chamber's internal environment. Based on these issues, there is a need for a compact, direct-drive, and automatic egg-turning design to improve the operating efficiency and hatching success rate of the incubator.

SUMMARY

The present disclosure provides an incubator, to solve the problems of high transmission energy loss and low transmission accuracy in current incubators.

To realize the above objective, the present disclosure provides an incubator, including: a base; and at least one trough body, the at least one trough body being arranged on the base, wherein both ends of the at least one trough body are provided with first connecting parts rotatably connected to the base, and an end of one of the first connecting parts is further provided with a second connecting part; and a driving mechanism, the driving mechanism comprises a driving part and a fixing part, wherein the fixing part is located at the end of the at least one trough body, the second connecting part being rotatably connected with the fixing part; the driving part being drivingly connected with the fixing part to move the fixing part along a preset direction, thus driving the trough body to rotate.

Furthermore, the base is provided with first limiting grooves adapted to the first connecting parts, the first connecting parts are embedded into the first limiting grooves and rotatably connected to them.

Furthermore, the second connecting part comprises a second connecting part, the fixing part is provided with a second limiting groove adapted to the second connecting part, the second connecting part is embedded into the second limiting groove and rotatably connected to it.

Furthermore, the second connecting part is located below the first connecting part at an end of the at least one trough body near the driving part, and the driving part is configured to drive the fixing part to move along the preset direction to rotate the at least one trough body.

Furthermore, the driving part comprises a driving motor, the driving motor is fixed to the base, and an outputting shaft of the driving motor is provided with a driving gear, a side of the fixing part facing the driving gear is provided with a gear structure, the driving gear and the gear structure are meshed for transmission.

Furthermore, a bottom of the fixing part is provided with an extending component extending towards the driving gear, the gear structure is located on an end of the extending component.

Furthermore, the base is provided with an incubation chamber, and the at least one trough body and the fixing part are located in the incubation chamber, and the incubation chamber is provided with at least two pressing plates, which are evenly distributed along a length direction of the fixing part, the at least two pressing plates are abutting against an upper side of the fixing part.

Furthermore, the incubation chamber is provided with at least two mounting protrusions, one end of each of the at least two pressing plates is detachably connected to each top of the at least two mounting protrusions, and another end of the pressing plates is extended above the fixing part.

Furthermore, the mounting protrusion is provided with a guiding groove, the fixing part is located in the guiding groove, and the fixing part is configured to move along the guiding groove, and the pressing plates is located in an open of the guiding groove.

Furthermore, the incubator further comprises a protective shell, the protective shell is connected to the base, and the protective shell is communicated with the incubation chamber, with the extending component passing through the protective shell to allow the gear structure to mesh with the driving motor.

Furthermore, the protective shell is provided with at least one third limiting groove, an outer surface of the driving part is provided with a clamping part, the clamping part is embedded into the at least one third limiting groove.

Furthermore, a cross-sectional shape of the at least one third limiting groove is matched with the clamping part, and when the clamping part is embedded into the at least one third limiting groove, they are fixed by a way of interference fit.

Furthermore, the protective shell is provided with at least one positioning protrusion, the at least one positioning protrusion is located below a tail end of the driving part.

Furthermore, the protective shell is provided with a ventilation hole, a position of the ventilation hole is corresponded to heater of the driving part.

Furthermore, a bottom of the base is provided with a concave groove, the incubation chamber is located at a top of the base, a bottom wall of the incubation chamber is provided with a through hole, the through hole is communicated with the concave groove, and the driving gear is located inside the through hole, a part of the driving gear protrudes into the incubation chamber to mesh with the gear structure.

Furthermore, both sides of the extending component are respectively provided with a first guiding plate and a second guiding plate, the first guiding plate and the second guiding plate are slidingly cooperated with both sides of an opening of the through hole.

Furthermore, the incubator further comprises a temperature sensor and a heater, the temperature sensor and the heater is located inside the incubation chamber, to maintain a temperature of the incubation chamber within a preset range.

Furthermore, the incubator comprises a plurality of trough bodies, the plurality of trough bodies are arranged at intervals along a width direction of the plurality of trough bodies, the fixing part is extending along the width direction.

Furthermore, an inner wall of the at least one trough body is provided with a curved concave surface, the curved concave surface is provided with several air holes, the curved concave surface is provided with a protective pad layer, the protective pad layer is provided with a pore structure.

Furthermore, the incubator further comprises a cover body, the cover body is arranged on the base.

The present disclosure further provides an incubator, the base of the incubator provides stable support, the at least one trough body is rotatably connected to the base by the first connecting parts at both ends, which can stably support eggs to be incubated. The fixing part of the driving mechanism is rotatably connected to the end of the at least one trough body via the second connecting part. When the driving part moves the connecting part along a preset direction, it can simultaneously drive the at least one trough body to rotate around the first connecting part, achieving automatic egg turning. This prevents the embryo from sticking to the eggshell. Furthermore, by directly transmitting through the driving part and the connecting part, the transmission path is simplified, reducing the accumulation of errors from intermediate components, improving the stability and accuracy of the egg-turning action. At the same time, the overall structure is compact, optimizing the internal layout of the incubator, and reducing manufacturing and maintenance costs.

BRIEF DESCRIPTION OF THE DRAWINGS

In order to more clearly illustrate the technical solutions of the embodiments of the present disclosure or the prior art, the following is a brief introduction to the drawings that need to be used in the description of the embodiments or the prior art. It is evident that the drawings described below are only some embodiments of the present disclosure. For those skilled in the art, without any inventive effort, other drawings can also be derived based on the structures shown in these drawings.

DESCRIPTION OF THE REFERENCE NUMERAL

Figure 1:
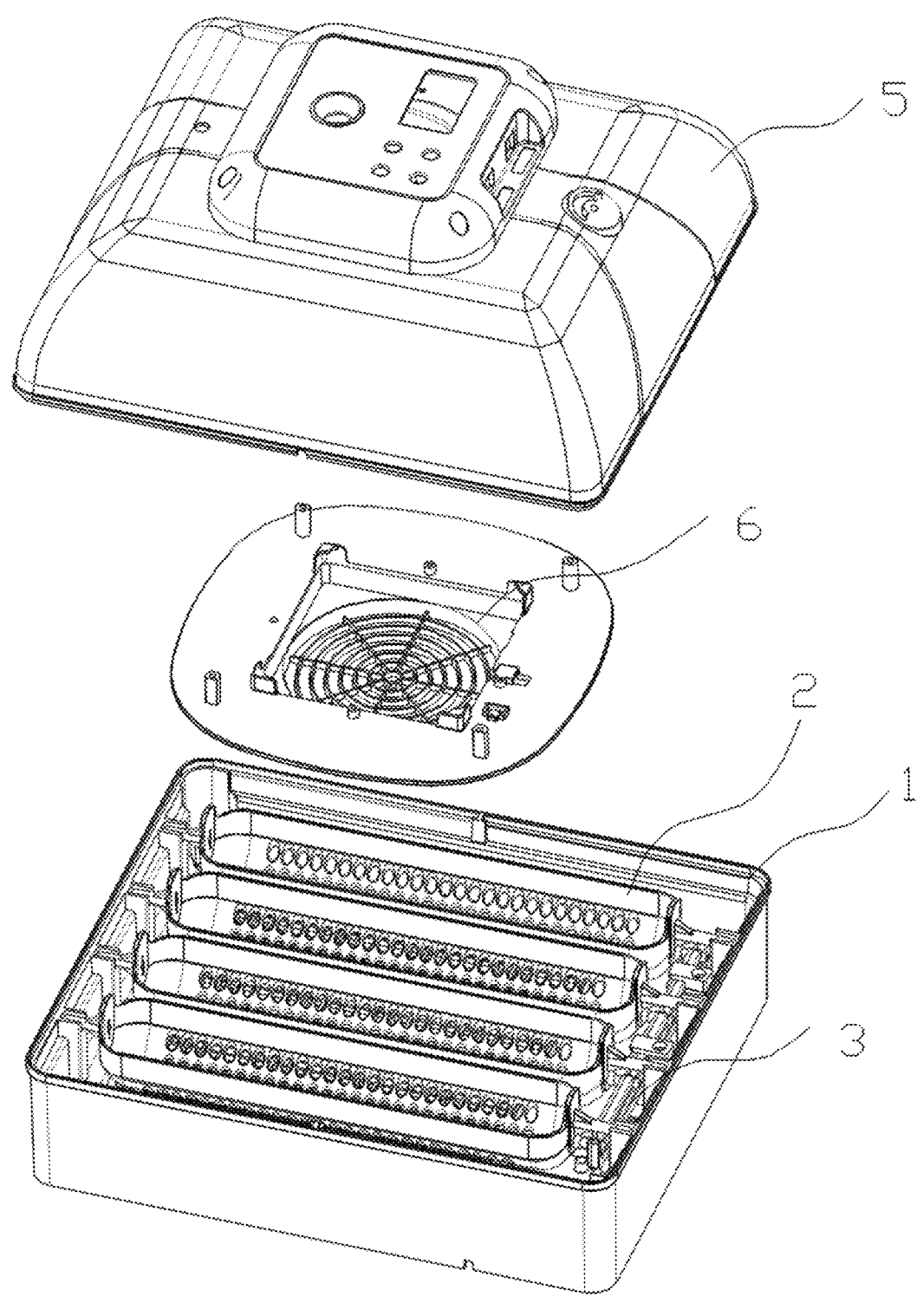
FIG. 1 is an exploded diagram of an incubator according to an embodiment of the present disclosure.

1 base, 11 first limiting groove, 13 incubation chamber, 14 mounting protrusion, 141 guiding groove, 15 concave groove, 16 through hole; and

2 trough body, 21 first connecting part, 22 second connecting part, 23 curved concave surface, 24 air hole; and

3 driving mechanism, 31 driving part, 311 outputting shaft, 312 driving gear, 313 clamping part, 314 driving motor, 32 fixing part, 321 gear structure, 322 extension component, 323 first guiding plate, 324 second guiding plate, 325 second limiting groove, 33 pressing plate; and

4 protective shell, 41 third limiting groove, 42 positioning protrusion, 43 ventilation hole; and

5 cover body; and

6 heater.

DETAILED DESCRIPTION OF THE EMBODIMENTS

The following will provide a clear and complete description of the technical solutions in the embodiments of the present disclosure, in conjunction with the accompanying drawings of the embodiments of the present disclosure. It is evident that the described embodiments are only part of the embodiments of the present disclosure, not all of the embodiments. Based on the embodiments in the present disclosure, all other embodiments obtained by those skilled in the art without making any creative effort are within the scope of the protection of the present disclosure.

It should be noted that if there are directional indications (such as up, down, left, right, front, back, etc.) in the embodiments of the present disclosure, these directional indications are only used to explain the relative positional relationship and movement of components under a specific posture. If the specific posture changes, the directional indications will also change accordingly.

Additionally, if there are descriptions involving "first," "second," and the like in the embodiments of the present disclosure, such descriptions are merely for descriptive purposes and should not be interpreted as indicating or implying relative importance or suggesting the number of technical features referred to. Therefore, features described with "first," "second," and the like may explicitly or implicitly include at least one of that feature. Furthermore, when "and/or" or "and/or" appears throughout the text, it means three parallel options: for example, "A and/or B" includes option A, or option B, or a solution where both A and B are satisfied simultaneously.

Moreover, the technical solutions between various embodiments can be combined, but it must be based on the ability of those skilled in the art to implement. When the combination of technical solutions is contradictory or cannot be implemented, such a combination of solutions should be considered non-existent and not within the protection scope required by the present disclosure.

In traditional incubator designs, there are often issues such as complex transmission mechanisms for egg turning and an abundance of parts, leading to insufficient accuracy, poor stability, and egg turning effects are affected by accumulated errors of intermediate components. At the same time, some incubators rely on manual egg turning, which is inefficient and difficult to ensure consistent egg turning frequency, leading to embryos sticking to the eggshell. Additionally, traditional structural layouts are loose, with low space utilization, which not only increases manufacturing and maintenance costs but may also affect the stability of the incubation chamber's environment due to redundant structures. Based on these issues, a compact, direct transmission design capable of automatic egg turning is needed to improve the operational efficiency and hatching success rate of the incubator.

To solve the above problems, the present disclosure proposes an incubator.

Figure 2:
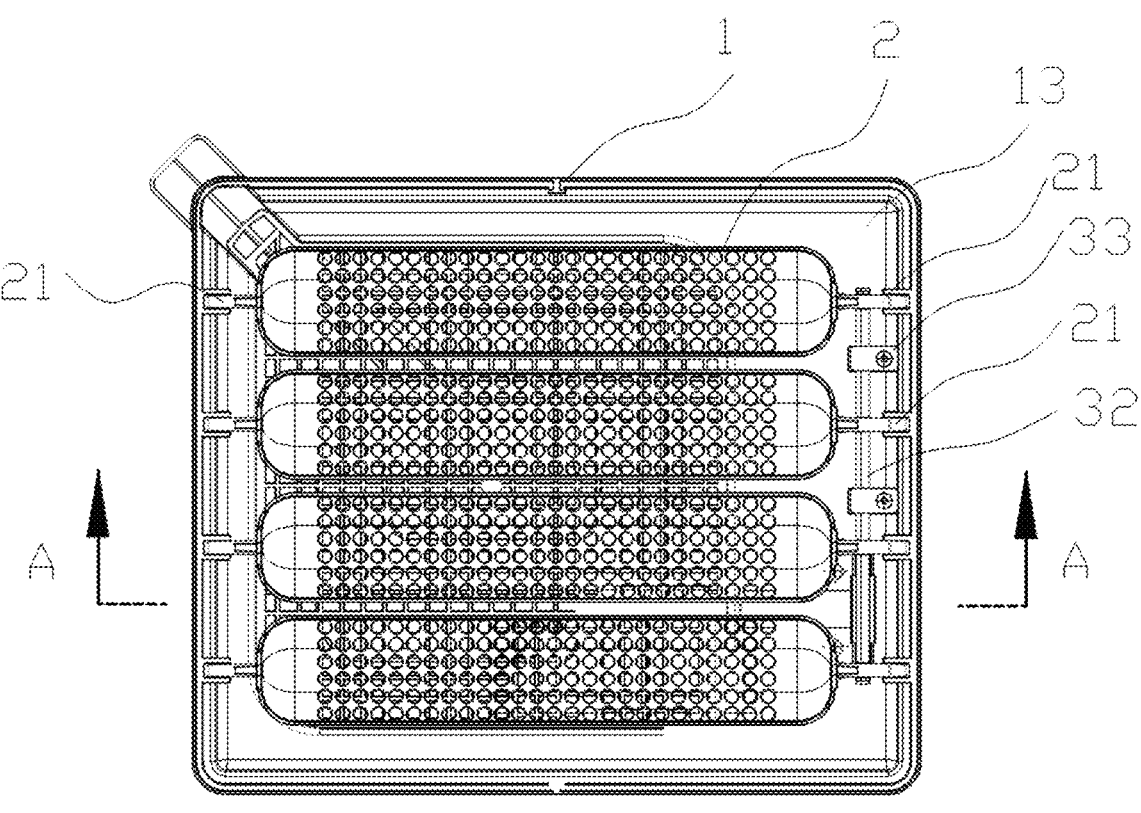
FIG. 2 is a top view of a base of the incubator according to an embodiment of the present disclosure.
Figure 3:
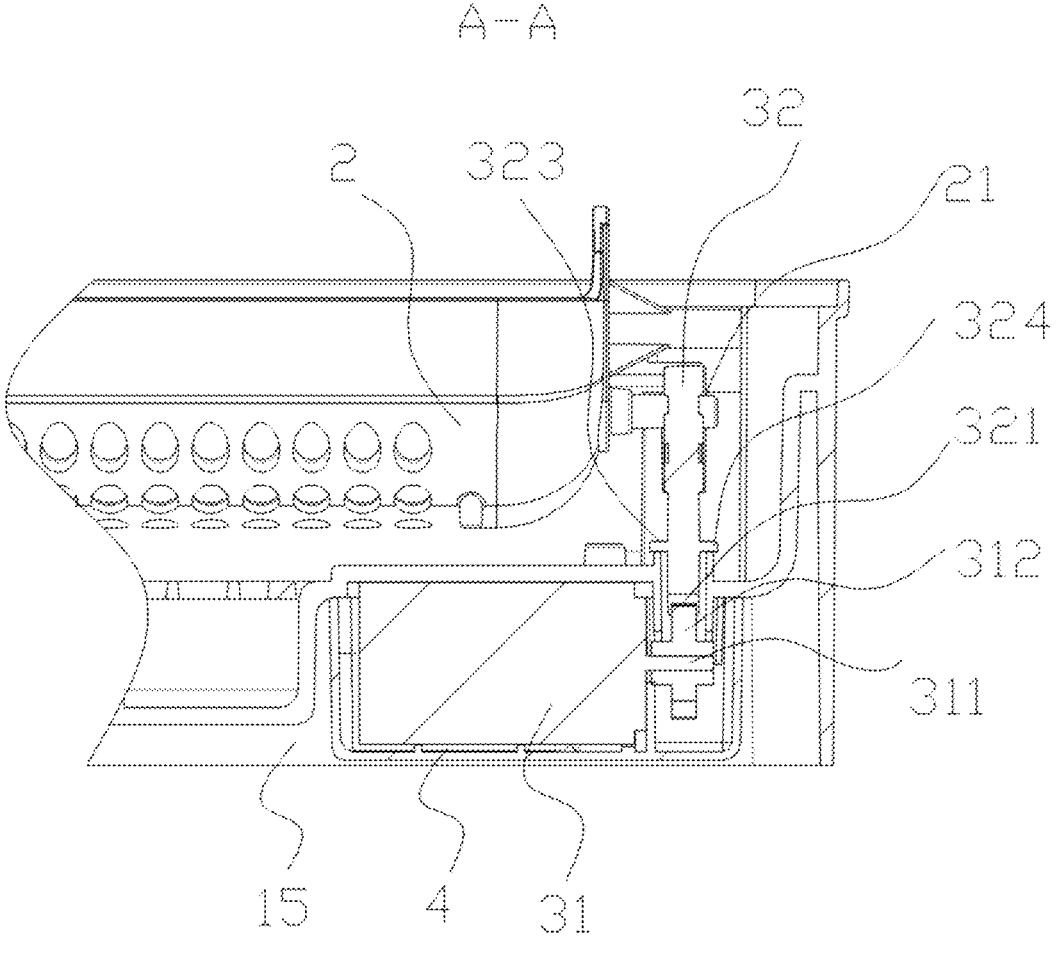
FIG. 3 is a partial sectional structural schematic at A-A of FIG. 2.
Figure 4:
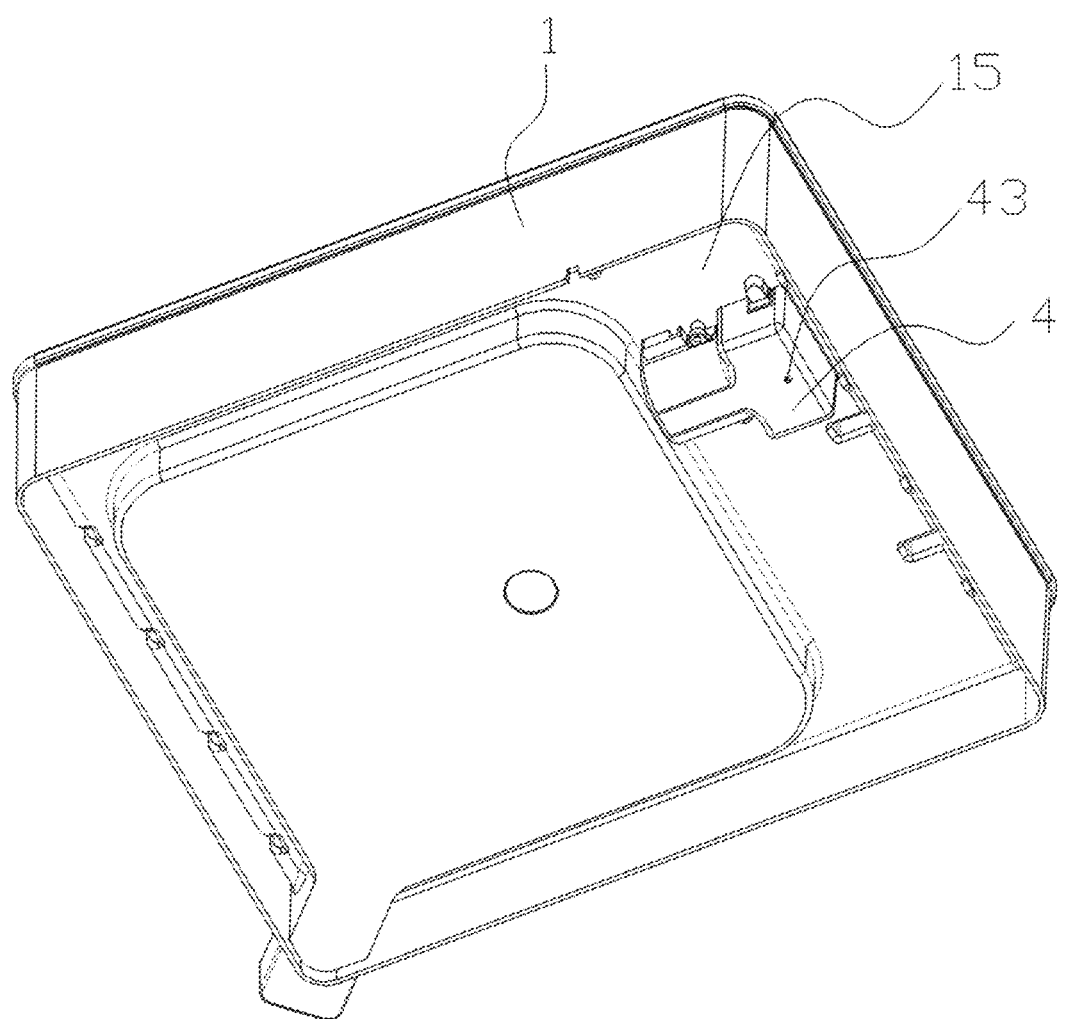
FIG. 4 a bottom view of the base of the incubator according to an embodiment of the present disclosure.
Figure 5:
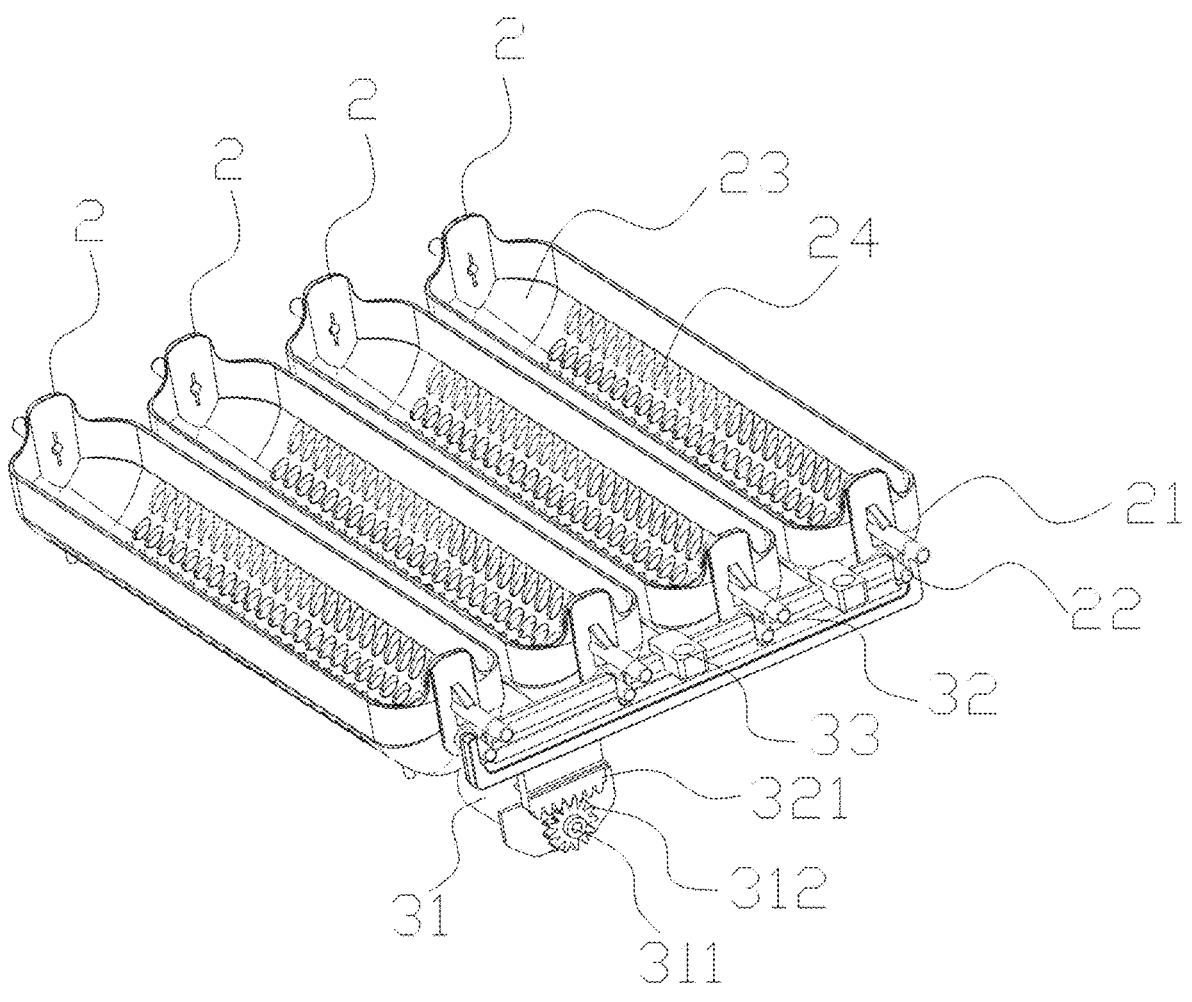
FIG. 5 is a schematic structural diagram of at least one trough body and the driving mechanism according to an embodiment of the present disclosure.
Figure 6:
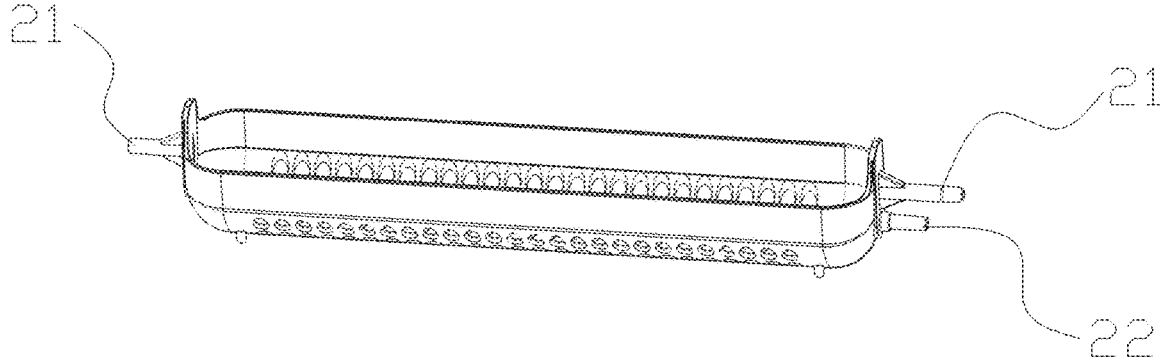
FIG. 6 is a schematic structural diagram of the trough body according to an embodiment of the present disclosure.
Figure 7:
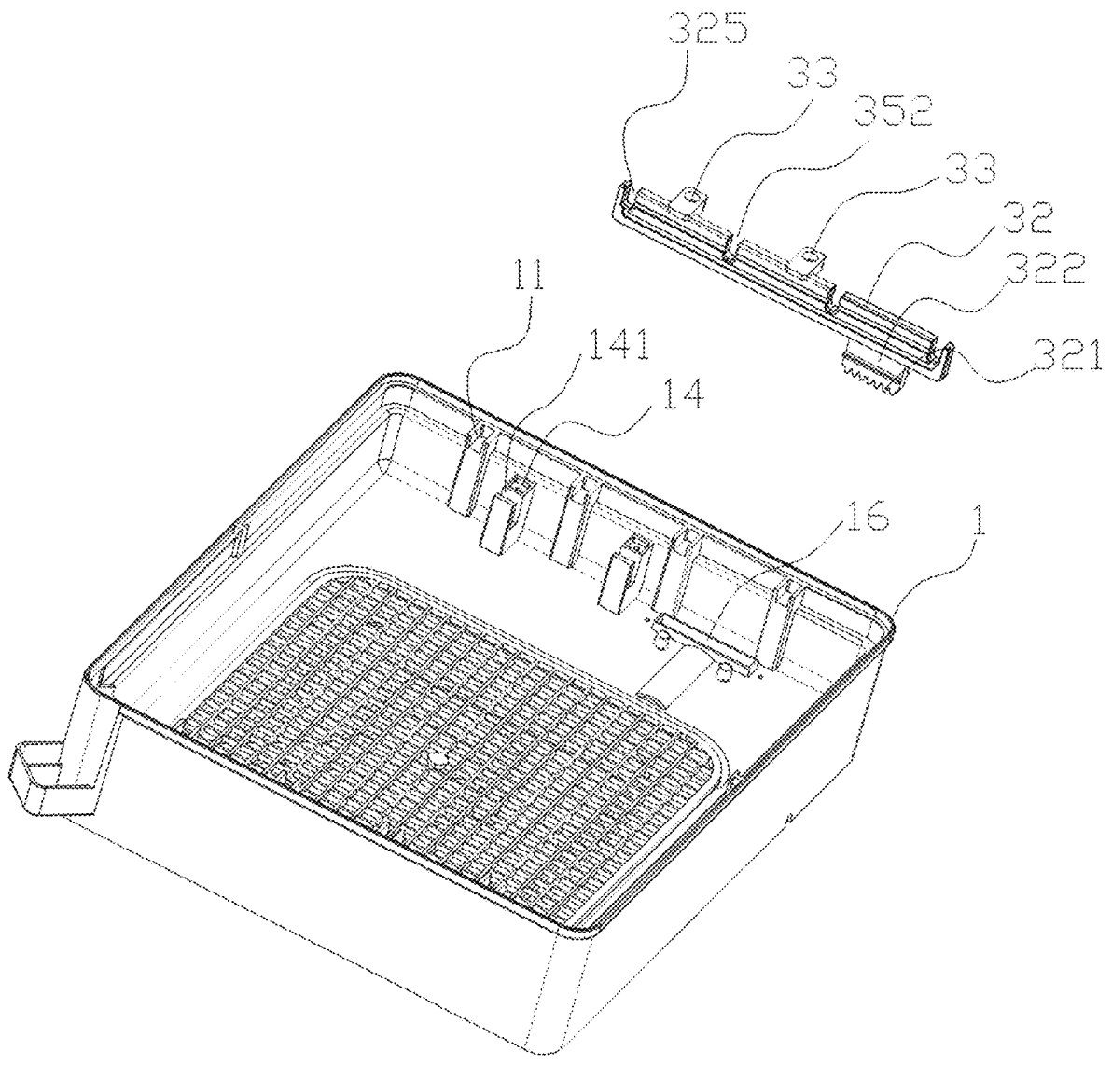
FIG. 7 is a schematic structural diagram of the base and the fixing part according to an embodiment of the present disclosure.
Figure 8:
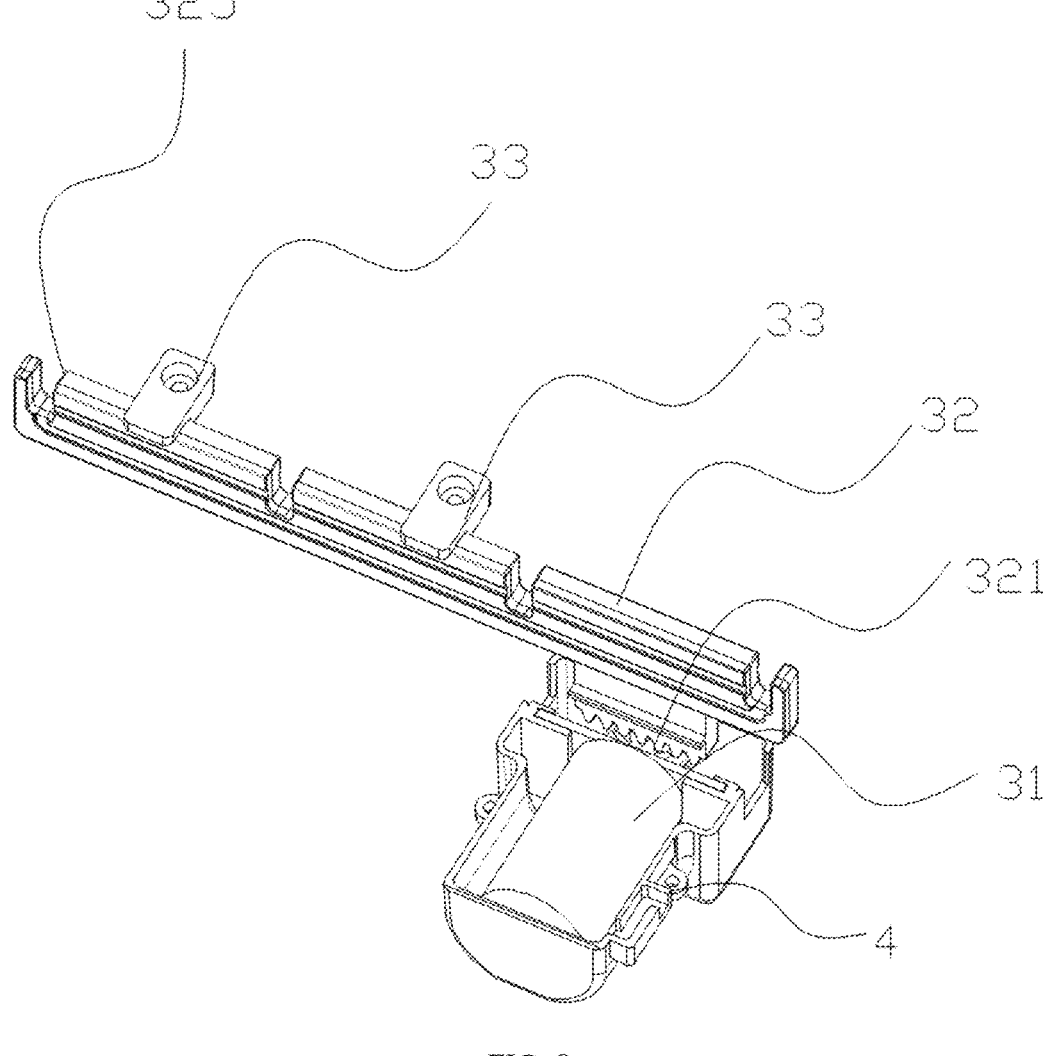
FIG. 8 is a schematic structural diagram of the fixing part and the driving mechanism according to an embodiment of the present disclosure.
Figure 9:
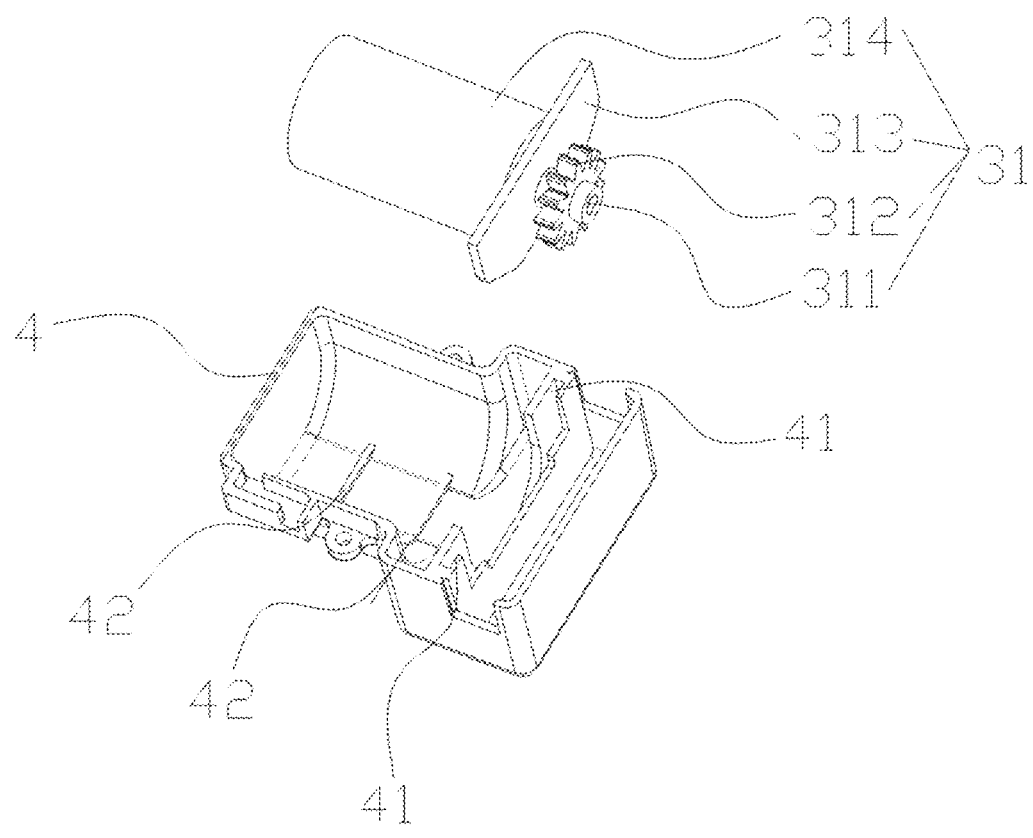
FIG. 9 is a schematic structural diagram of the driving mechanism and a protective shell according to an embodiment of the present disclosure.

With reference to FIGS. 1 to 9, in one embodiment of the present disclosure, the incubator includes a base 1, at least one trough body 2, and a driving mechanism 3. The at least one trough body 2 is located on the base 1, with both ends of the at least one trough body 2 provided with first connecting parts 21 that are rotatably connected to the base 1. One end of the at least one trough body 2 near a driving part 31 is provided with a second connecting part 22. The driving mechanism 3 includes a driving part 31 and a fixing part 32. The fixing part 32 is located at one end of the at least one trough body 2, and the second connecting part 22 is rotatably connected to the fixing part 32. The driving part 31 is drivingly connected to the fixing part 32 to drive the fixing part 32 to move in a preset direction, thereby driving the trough body 2 to rotate.

In the present embodiment, the base 1 provides stable support, and the at least one trough body 2 is rotatably connected to the base 1 through the first connecting part 21 at both ends, which can stably carry the eggs to be incubated. In the driving mechanism 3, the fixing part 32 is rotatably connected to an end of the at least one trough body 2 via the second connecting part 22, and when the driving part 31 moves the fixing part 32 in the preset direction, it can simultaneously drive the at least one trough body 2 to rotate around the first connecting part 21, achieving automatic egg turning. This prevents the embryo from sticking to the eggshell and simplifies the transmission path through the direct transmission between the driving part 31 and the fixing part 32, reducing error accumulation in intermediate components. This improves the stability and precision of the egg-turning action. Additionally, the overall structure is compact, optimizing the internal space layout of the incubator, and reducing manufacturing and maintenance costs.

Furthermore, the base 1 is provided with first limiting grooves 11 that matched the first connecting parts 21. The first connecting parts 21 are embedded in the first limiting grooves 11 to achieve a rotating connection.

In the present embodiment, the first connecting part 21 adopts a structure where the first connecting parts 21 are combined with the first limiting grooves 11 on the base 1. By embedding the first connecting parts 21 in the first limiting grooves 11, a rotating connection is achieved, which provides a stable rotating support for the at least one trough body 2. It ensures that the at least one trough body 2 2 rotates smoothly around the fixed axis when driven by the driving mechanism 3, while the embedded relationship between the first connecting parts 21 and the first limiting grooves 11 limits the displacement of the at least one trough body 2 in non-rotating directions, avoiding shaking or displacement of the at least one trough body 2. This guarantees the stable posture of the at least one trough body 2 during the egg-turning process. Moreover, this structure is simple and easy to assemble, reduces errors caused by fitting gaps, and improves the transmission accuracy and reliability of the overall mechanism. The first connecting part 21 extends along the length direction of the at least one trough body 2 to form an axial structure.

Furthermore, the second connecting part 22 includes a second connecting part, and the fixing part 32 is provided with a second limiting groove 325 that matches the second connecting part. The second connecting part is embedded in the second limiting groove 325 to achieve a rotating connection.

In the present embodiment, the second connecting part 22 adopts a structure where the second connecting part is combined with the second limiting groove 325 on the fixing part 32. By embedding the second connecting part in the second limiting groove 325, a rotating connection is achieved, which allows flexible rotational cooperation between the at least one trough body 2 and the fixing part 32. This ensures that when the fixing part 32 moves in the preset direction, it smoothly drives the at least one trough body 2 to rotate around the first connecting part 21. The embedded relationship between the second connecting part and the second limiting groove 325 also limits their relative displacement in directions perpendicular to the rotating plane, preventing the at least one trough body 2 and the fixing part 32 from disengaging or shaking, ensuring the stability and precision of power transmission. This structure is compact and easy to process and assemble, adapts to angle changes during the rotation of the at least one trough body 2, reduces motion interference, and enhances the overall reliability of the egg-turning mechanism. The second connecting part 22 extends along the length direction of the at least one trough body 2 to form an axial structure.

Furthermore, the second connecting part is located below the first connecting parts 21 at the ends of the at least one trough body 2 close to the driving part 31. The driving part 31 moves the fixing part 32 in the preset direction to drive the at least one trough body 2 to rotate.

In the present embodiment, by placing the second connecting part below the first connecting parts 21 at the ends of the at least one trough body 2 near the driving part 31, when the driving part 31 moves the fixing part 32 in the preset direction, the lever principle forms a reasonable force arm structure. This enables the at least one trough body 2 to rotate smoothly around the first connecting parts 21 with a smaller driving force, improving the power transmission efficiency and allowing precise control of the rotation angle of the at least one trough body 2. This layout also ensures more balanced force on the at least one trough body 2, preventing jamming or shifting during rotation due to unreasonable torque, reducing component wear, and ensuring stable and reliable egg-turning actions. It also optimizes the overall structural space layout, making the connection between the driving mechanism 3 and the at least one trough body 2 more compact, improving the utilization of internal space in the incubator.

Furthermore, the driving part 31 includes a driving motor fixed to the base 1, and the outputting shaft 311 of the driving motor is provided with a driving gear 312. The side of the fixing part 32 facing the driving gear 312 is equipped with a gear structure 321, and the driving gear 312 meshes with the gear structure 321 for power transmission.

In the present embodiment, the driving part 31 has a driving motor, and a driving gear 312 is set on its outputting shaft 311. By meshing with the gear structure 321 on the fixing part 32, the rotational motion of the driving motor is stably converted into the linear motion of the fixing part 32. This gear meshing transmission method not only has high power transmission efficiency and rapid response, but also allows precise control over the movement distance and speed of the fixing part 32, thereby achieving accurate control over the rotation angle of the at least one trough body 2. Furthermore, the structure is compact and tightly fitted, reducing slippage or looseness during transmission and ensuring consistency and stability of the egg-turning action. The driving motor is directly fixed to the base 1, which enhances the overall stability of the structure, reduces vibration interference during operation, and improves the automation level and operational reliability of the incubator.

Furthermore, the bottom of the fixing part 32 is provided with an extending part 322 facing the driving gear 312. The end of the extending part 322 is equipped with the gear structure 321 that meshes with the driving gear 312.

In the present embodiment, the bottom of the fixing component 32 is provided with an extending component 322 that extends toward the driving gear 312, and the gear structure 321 is arranged at the end of the extending component 322 to engage with the driving gear 312. This design effectively shortens the distance between the fixing component 32 and the driving gear 312 through the extending component 322, bringing their meshing position closer to the driving motor, thereby reducing the lever arm in the transmission process and minimizing structural deformation or transmission errors caused by excessive torque. Additionally, this design allows for flexible adjustment of the spatial position of the meshing point, avoiding interference with other components inside the incubator and creating a more compact overall layout.

Furthermore, the base 1 is provided with an incubation chamber 13, where the plurality of trough bodies 2 and the fixing component 32 are located within the incubation chamber 13. The incubation chamber 13 is equipped with at least two pressing plates 33, which are evenly distributed along the length direction of the fixing component 32, with the pressing plates 33 partially or completely contacting the upper side of the fixing component 32.

In the present embodiment, the base 1 houses the at least one trough body 2 and the fixing component 32 within the incubation chamber 13, providing a relatively enclosed environment for the incubation process. This reduces external interference to maintain stable temperature and humidity conditions. The at least two pressing plates 33, evenly distributed along the length direction of the fixing component 32 inside the incubation chamber 13, make effective contact with the upper side of the fixing component 32, providing effective limiting to prevent the fixing component 32 from tilting upward or bouncing during movement due to uneven force or vibration. This ensures the fixing component 32 moves smoothly along the preset trajectory, ensuring consistency and precision in the rotation angle of the at least one trough body 2. Additionally, the even distribution of the pressing plates 33 allows for balanced force distribution on each part of the fixing component 32, reducing local wear, improving the stability and longevity of the overall mechanism, and making the egg turning action more reliable, which helps improve the hatching success rate.

Furthermore, the incubation chamber 13 is equipped with at least two mounting protrusions 14, and one end of each of the at least two pressing plate 33 is detachably connected to a top of the mounting protrusion 14, while another end extends above the fixing component 32.

In the present embodiment, the at least two mounting protrusions 14 inside the incubation chamber 13 provide a stable installation base for the at least two pressing plate 33. One end of the pressing plate 33 is detachably connected to the top of the mounting protrusion 14, allowing for easy adjustment of the pressing plate 33's position or disassembly for maintenance. The other end extends above the fixing component 32 to provide a limiting stop. This structure ensures the effective constraint of the fixing component 32 by the pressing plate 33, preventing vertical bouncing, while the detachable design enhances the flexibility and maintainability of the mechanism. A distribution of multiple mounting protrusions 14 and an extension layout of the pressing plate 33 are complement each other, allowing for more balanced force distribution on the fixing component 32, further enhancing the stability of the limiting effect, and ensuring that the movement of the fixing component 32 and the rotation of the at least one trough body 2 are accurate and smooth.

Furthermore, the mounting protrusion 14 is equipped with a guiding groove 141, in which the fixing component 32 is located. The fixing component 32 can move along the guiding groove 141, and the pressing plate 33 is located at an opening of the guiding groove 141.

In the present embodiment, the guiding groove 141 in the mounting protrusion 14 provides a clear movement path for the fixing component 32, allowing it to slide smoothly along the guiding groove 141 and preventing lateral displacement or wobbling during movement. The pressing plate 33, located at the opening of the guiding groove 141, constrains the fixing component 32 from above, working in conjunction with the guiding groove 141 to form multidimensional limiting in the vertical direction and horizontal direction, ensuring the accuracy and stability of the fixing component 32's movement. This design both guides the movement direction of the fixing component 32 through the guiding groove 141 and prevents the fixing component 32 from tilting upward with the help of the pressing plate 33. The combined effect of the guiding groove 141 and the pressing plate 33 reduces transmission errors during the process, ensures consistency in the rotation angle of the at least one trough body 2, and minimizes friction losses between the fixing component 32 and other parts, improving the overall reliability and service life of the mechanism.

Furthermore, the incubator also includes a protective shell 4, which is connected to the base 1 and communicates with the incubation chamber 13. The extending component 322 passes through the protective shell 4, allowing the gear structure 321 to mesh with the driving motor.

In the present embodiment, the protective shell 4 is connected to the base 1 and communicates with the incubation chamber 13, providing physical protection to components such as the driving motor, preventing external dust, moisture, or accidental contact from causing damage. The communication structure with the incubation chamber 13 provides a passage for the extending component 322 to pass through, ensuring normal meshing and transmission between the gear structure 321 and the driving motor. Additionally, the protective shell 4 can block some of the heat generated by the driving components 31 from spreading into the incubation chamber 13, reducing interference with the stable temperature and humidity environment inside the incubation chamber 13. Moreover, this design ensures that the driving components 31 are both relatively independent and precisely matched with the internal structure of the incubation chamber 13, improving the safety and durability of the equipment while maintaining the transmission efficiency and stability of the incubation environment.

Furthermore, the protective shell 4 is provided with at least one third limiting slot 41, and the outer surface of the drive part 31 is provided with a clamping part 313, which is embedded in the third limiting slot 41.

In the present embodiment, the third limiting slot 41 in the protective shell 4 is engaged with the clamping part 313 on the outer surface of the drive part 31. By embedding the clamping part 313 into the third limiting slot 41, a firm positioning and fixation of the drive part 31 is achieved, preventing displacement, tilting, or loosening caused by vibration or force during operation. This ensures the accuracy and stability of the meshing between the driving gear 312 and the gear structure 321 on the fixing member 32, avoiding transmission errors or jamming caused by the displacement of the drive part 31. At the same time, this snap-fit structure simplifies the installation process of the drive part 31, improving assembly efficiency, enhancing the overall compactness and reliability of the structure, and ensuring precise power transmission.

Furthermore, the cross-sectional shape of the third limiting slot 41 is adapted to the clamping part 313, and after the clamping part 313 is embedded in the third limiting slot 41, it is fixed by a way of interference fit.

In the present embodiment, the cross-sectional shape of the third limiting slot 41 is adapted to the clamping part 313 and fixed by interference fit, allowing a tight and stable connection between the drive part 31 and the protective shell 4. This completely eliminates the gap between them, effectively preventing displacement or shaking of the drive part 31 due to vibration during operation, ensuring that the driving gear 312 and the gear structure 321 always maintain accurate meshing, avoiding transmission deviations or jamming. Furthermore, the interference fit does not require additional fasteners for reliable fixation, simplifying the assembly process, reducing the number of parts, improving structural compactness, and further enhancing the operational stability and lifespan of the driving mechanism 3.

Furthermore, the protective shell 4 is provided with at least one positioning protrusion 42, located beneath a rear end of the drive part 31.

In the present embodiment, the positioning protrusion 42 beneath the rear end of the drive part 31 in the protective shell 4 can effectively support the rear end of the drive part 31, preventing it from sinking or tilting due to its own weight or vibration during operation. This ensures that the drive part 31 remains in a horizontally stable position, thereby guaranteeing uniform meshing clearance between the driving gear 312 and the gear structure 321. It also avoids excessive wear on local tooth surfaces or transmission jamming caused by tilting of the drive part 31. Additionally, this support structure can disperse the forces acting on the drive part 31 during operation, reducing the pressure on the area where the third limiting slot 41 and the clamping part 313 engage, enhancing the reliability of the overall fixation structure and enabling smoother and more precise power transmission.

Furthermore, the protective shell 4 is provided with a ventilation hole 43, and the location of the ventilation hole 43 corresponds to a heating area of the drive part 31.

In the present embodiment, the ventilation hole 43 on the protective shell 4 corresponds to the heating area of the drive part 31, and can efficiently guide the heat generated by the drive part 31 during operation out of the protective shell 4. This prevents heat from accumulating inside the protective shell 4, avoiding the impact of high temperatures on the performance of the drive part 31 (such as the stability of the drive motor's speed). At the same time, it reduces the diffusion of heat through the protective shell 4 to the incubation chamber 13, preventing temperature fluctuations from disturbing the incubation environment. This targeted heat dissipation design ensures the normal operation of the drive part 31 while maintaining the stable temperature and humidity conditions required for incubation, enhancing the overall operational reliability and hatching success rate of the incubator.

Furthermore, the bottom of the base 1 is provided with a recessed groove 15, the incubation chamber 13 is located at the top of the base 1, a bottom wall of the incubation chamber 13 is provided with a through hole 16, and the through hole 16 communicates between the bottom wall of the incubation chamber 13 and the recessed groove 15. The driving gear 312 is located within the through hole 16, and at least part of the driving gear 312 protrudes into the incubation chamber 13 to engage with the gear structure 321.

In the present embodiment, the recessed groove 15 at the bottom of the base 1 communicates with the through hole 16 in the bottom wall of the incubation chamber 13. The driving gear 312 is located within the through hole 16 and partially protrudes into the incubation chamber 13 to mesh with the gear structure 321. This design allows the recessed groove 15 to provide a hidden space for the driving gear 312, reducing its occupation of the internal space of the incubation chamber 13, making the overall structure more compact. It also accurately defines the installation position of the driving gear 312 through the through hole 16, ensuring the meshing accuracy with the gear structure 321. Additionally, the recessed groove 15 can block some of the heat generated by the driving gear 312 from spreading into the incubation chamber 13. The through hole 16 also prevents impurities in the incubation chamber 13 from falling directly into the gear meshing area, affecting the transmission. This ensures stable power transmission while optimizing the spatial layout and maintaining a clean and stable incubation environment.

Furthermore, the two sides of the extension component 322 are provided with a first guiding plate 323 and a second guiding plate 324, which slide and fit with the two sides of the opening of the through hole 16.

In the present embodiment, the first guiding plate 323 and the second guiding plate 324 on both sides of the extending component 322 slide and cooperate with the openings on both sides of the through hole 16. This provides precise directional constraints for the movement of the extending component 322, preventing lateral displacement or shaking as it moves with the fixing part 32. This ensures that the gear structure 321 and the driving gear 312 maintain stable engagement at all times, avoiding transmission jams or gear surface wear caused by displacement. At the same time, this sliding fit structure can disperse the force on the extending component 322, reducing the load at the meshing point of the gear structure 321, enhancing the structural stability of the extending component 322, and allowing smoother movement of the fixing part 32, further improving the overall operational accuracy and reliability of the driving mechanism.

Furthermore, the incubator includes a plurality of trough bodies 2, which are arranged at intervals along a width direction of the plurality of trough bodies 2. The fixing part 32 extending along the width direction.

In the present embodiment, the plurality of trough bodies 2 are spaced along the width direction of each trough body 2, and the fixing part 32 extends along this width direction. This design allows for the simultaneous carrying of more eggs to be incubated by the plurality of trough bodies 2, increasing the incubator's incubation capacity. It also synchronously drives the rotation of the plurality of trough bodies 2 by connecting the fixing part 32 with the ends of all groove bodies 2, ensuring consistency in the egg-turning action of each at least one trough body 2. This avoids uneven hatching results due to rotational differences between different groove bodies 2. Additionally, along with the extending design of the fixing part 32, optimizes the lateral layout of the internal space of the incubator, making the structure more compact, reducing unnecessary space waste, and enhancing the overall equipment's space utilization and incubation efficiency.

Furthermore, the inner wall of the at least one trough body 2 is provided with an curved concave surface 23, which is equipped with several air holes 24. The surface of the curved concave surface 23 is covered with a protective cushion layer, which has a porous structure.

In the present embodiment, the curved concave surface 23 on the inner wall of the at least one trough body 2 fits a shape of an egg body, providing stable support to prevent rolling. The air holes 24 on the curved concave surface 23 ensure air circulation within the incubation chamber 13, allowing for uniform heating and ventilation of the egg body. The protective cushion layer on the surface absorbs vibrations and prevents the egg body from being scratched, and its porous structure does not obstruct the air holes' ventilation function. This allows air to pass through the cushion layer and come into contact with the egg body. Overall, the structure ensures the stability and safety of egg placement while also providing good ventilation and heat transfer, which improves the suitability of the incubation environment and promotes the normal development of the embryo.

Furthermore, the incubator further includes a cover body 5, which is placed on top of the base 1.

In the present embodiment, the cover body 5, when placed on the base 1, forms a relatively enclosed space within the incubation chamber 13, effectively reducing interference from external factors (such as temperature, humidity, dust, impurities, etc.) on the internal incubation environment. This helps maintain the stable temperature and humidity conditions required for incubation. Additionally, the cover prevents external objects from accidentally falling into the incubation chamber 13, which could damage the eggs or internal components, offering protection. Furthermore, the enclosed structure reduces heat and moisture loss from the chamber, lowering energy consumption of the temperature and humidity control systems, thus making the incubation process more efficient and stable, and improving the overall hatching results.

Furthermore, the incubator further includes a temperature sensor and heater 6, with the temperature sensor and heater 6 being located inside the incubation chamber 13, maintaining the temperature within the preset range.

In the present embodiment, the temperature sensor inside the incubation chamber 13 monitors the internal temperature in real time. When the temperature deviates from the preset range, the heater 6 can be activated or deactivated. The collaborative operation of these components ensures that the temperature of the incubation chamber 13 is precisely maintained within the suitable range for embryo development, preventing abnormal growth caused by excessively high or low temperatures. This automatic temperature control structure ensures that the incubation process remains in a stable temperature environment, reducing manual intervention, increasing the level of automation, and improving the success rate of incubation. Additionally, the fast response of the temperature sensor and heater 6 can quickly compensate for temperature fluctuations, providing continuous optimal development conditions for the eggs.

The technical solution of the present disclosure provides stable support through the base 1, and the at least one trough body 2 is rotatably connected to the base 1 via the first connecting parts 21 at both ends. It can stably bear the eggs to be incubated. In the driving mechanism 3, the fixing part 32 is rotatably connected to the end of the at least one trough body 2 via the second connecting part 22. When the driving component 31 drives the fixing part 32 to move in the preset direction, it synchronously drives the at least one trough body 2 to rotate around the first connecting part 21, achieving automatic egg turning. This prevents the embryo from sticking to the eggshell and simplifies the transmission path by directly driving the fixing part 32 with the driving component 31, reducing error accumulation from intermediate components and improving the stability and precision of the egg-turning action. At the same time, the compact overall structure helps optimize the internal space layout of the incubator, reducing manufacturing and maintenance costs.

The above is only a preferred embodiment of the present disclosure, and does not limit the scope of the disclosure. Any equivalent structural changes made under the concept of the disclosure based on the content of the present disclosure's specification and accompanying drawings, or direct/indirect application in other related technical fields, are within the scope of the patent protection of the present disclosure.

What is claimed is:

1. An incubator, comprising:
a base; and
at least one trough body, the at least one trough body being arranged on the base, wherein both ends of the at least one trough body are provided with first connecting parts rotatably connected to the base, and an end of one of the at least one trough body is further provided with a second connecting part; and
a driving mechanism, the driving mechanism comprises a driving part and a fixing part, wherein the fixing part is located at the end of the at least one trough body, the second connecting part being rotatably connected with the fixing part; the driving part being drivingly connected with the fixing part to move the fixing part along a preset direction, thus driving the at least one trough body to rotate;
the driving part comprises a driving motor, the driving motor is fixed to the base, and an outputting shaft of the driving motor is provided with a driving gear, a side of the fixing part facing the driving gear is provided with a gear structure, the driving gear and the gear structure are meshed for transmission;
a bottom of the fixing part is provided with an extending component extending towards the driving gear, the gear structure is located on an end of the extending component;
the base is provided with an incubation chamber, and the at least one trough body and the fixing part are located in the incubation chamber, and the incubation chamber is provided with at least two pressing plates, which are evenly distributed along a length direction of the fixing part, the at least two pressing plates are abutting against an upper side of the fixing part.

2. The incubator according to claim 1, wherein the base is provided with first limiting grooves adapted to the first connecting parts, the first connecting parts are embedded into the first limiting grooves and rotatably connected to them.

3. The incubator according to claim 2, wherein the fixing part is provided with a second limiting groove adapted to the second connecting part, the second connecting part is embedded into the second limiting groove and rotatably connected to it.

4. The incubator according to claim 3, wherein the second connecting part is located below the first connecting part at the end of the at least one trough body near the driving part, and the driving part is configured to drive the fixing part to move along the preset direction to rotate the at least one trough body.

5. The incubator according to claim 1, wherein the incubation chamber is provided with at least two mounting protrusions, one end of each of the at least two pressing plates is detachably connected to each top of the at least two mounting protrusions, and another end of the pressing plates is extended above the fixing part.

6. The incubator according to claim 5, wherein the mounting protrusion is provided with a guiding groove, the fixing part is located in the guiding groove, and the fixing part is configured to move along the guiding groove, and the pressing plates is located in an open of the guiding groove.

7. The incubator according to claim 1, wherein the incubator further comprises a protective shell, the protective shell is connected to the base, and the protective shell is communicated with the incubation chamber, with the extending component passing through the protective shell to allow the gear structure to mesh with the driving motor.

8. The incubator according to claim 7, wherein the protective shell is provided with at least one third limiting groove, an outer surface of the driving part is provided with a clamping part, the clamping part is embedded into the at least one third limiting groove.

9. The incubator according to claim 8, wherein a cross-sectional shape of the at least one third limiting groove is matched with the clamping part, and when the clamping part is embedded into the at least one third limiting groove, they are fixed by a way of interference fit.

10. The incubator according to claim 7, wherein the protective shell is provided with at least one positioning protrusion, the at least one positioning protrusion is located below a tail end of the driving part.

11. The incubator according to claim 1, wherein the protective shell is provided with a ventilation hole, a position of the ventilation hole is corresponded to heater of the driving part.

12. The incubator according to claim 1, wherein a bottom of the base is provided with a concave groove, the incubation chamber is located at a top of the base, a bottom wall of the incubation chamber is provided with a through hole, the through hole is communicated with the concave groove, and the driving gear is located inside the through hole, a part of the driving gear protrudes into the incubation chamber to mesh with the gear structure.

13. The incubator according to claim 12, wherein both sides of the extending component are respectively provided with a first guiding plate and a second guiding plate, the first guiding plate and the second guiding plate are slidingly cooperated with both sides of an opening of the through hole.

14. The incubator according to claim 1, wherein the incubator further comprises a temperature sensor and a heater, the temperature sensor and the heater is located inside the incubation chamber, to maintain a temperature of the incubation chamber within a preset range.

15. The incubator according to claim 1, wherein the incubator comprises a plurality of trough bodies, the plurality of trough bodies are arranged at intervals along a width direction of the plurality of trough bodies, the fixing part is extending along the width direction.

16. The incubator according to claim 1, wherein an inner wall of the at least one trough body is provided with a curved concave surface, the curved concave surface is provided with several air holes, the curved concave surface is provided with a protective pad layer, the protective pad layer is provided with a pore structure.

17. The incubator according to claim 1, wherein the incubator further comprises a cover body, the cover body is arranged on the base.

*   *   *   *   *